US010331355B2

(12) United States Patent
Toda et al.

(10) Patent No.: US 10,331,355 B2
(45) Date of Patent: Jun. 25, 2019

(54) CONTROL DEVICE, ELECTRONIC TIMEPIECE, PROCESSING CONTROL METHOD AND COMPUTER READABLE STORAGE MEDIUM

(71) Applicant: CASIO COMPUTER CO., LTD., Tokyo (JP)

(72) Inventors: Naoto Toda, Tokorozawa (JP); Tatsuya Sekitsuka, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 53 days.

(21) Appl. No.: 15/661,511

(22) Filed: Jul. 27, 2017

(65) Prior Publication Data

US 2018/0088806 A1    Mar. 29, 2018

(30) Foreign Application Priority Data

Sep. 23, 2016    (JP) .................................. 2016-185063

(51) Int. Cl.
*G06F 3/06* (2006.01)

(52) U.S. Cl.
CPC ............ *G06F 3/061* (2013.01); *G06F 3/0625* (2013.01); *G06F 3/0634* (2013.01); *G06F 3/0655* (2013.01); *G06F 3/0679* (2013.01); *Y02D 10/154* (2018.01)

(58) Field of Classification Search
CPC ...... G06F 3/061; G06F 3/0625; G06F 3/0634; G06F 3/0655; G06F 3/0679; Y02D 10/154

USPC ......................................................... 711/103
See application file for complete search history.

(56) References Cited

U.S. PATENT DOCUMENTS

| 2011/0167210 A1* | 7/2011 | Kwon | ..................... G06F 3/061 |
| | | | 711/105 |
| 2015/0185706 A1* | 7/2015 | Hasegawa | ............... G04R 20/02 |
| | | | 368/47 |
| 2015/0293580 A1* | 10/2015 | Munoz | .................. G06F 1/3206 |
| | | | 713/323 |

FOREIGN PATENT DOCUMENTS

JP    2007-206885 A    8/2007

* cited by examiner

*Primary Examiner* — Shane D Woolwine
(74) *Attorney, Agent, or Firm* — Scully Scott Murphy & Presser

(57) ABSTRACT

A control device, including: a first processor; a second processor which has a higher performance than the first processor; and a storage in which data is stored so as to be readable and writable by the second processor, wherein a part of the storage is usable as a common storage area which is readable and writable by the first processor and the second processor, in reading operation, the second processor reads first data from out of the common storage area in the storage and writes the first data to the common storage area, and the first processor reads the first data from the common storage area, and in writing operation, the first processor writes second data to the common storage area, and the second processor stores the second data out of the common storage area in the storage.

14 Claims, 4 Drawing Sheets

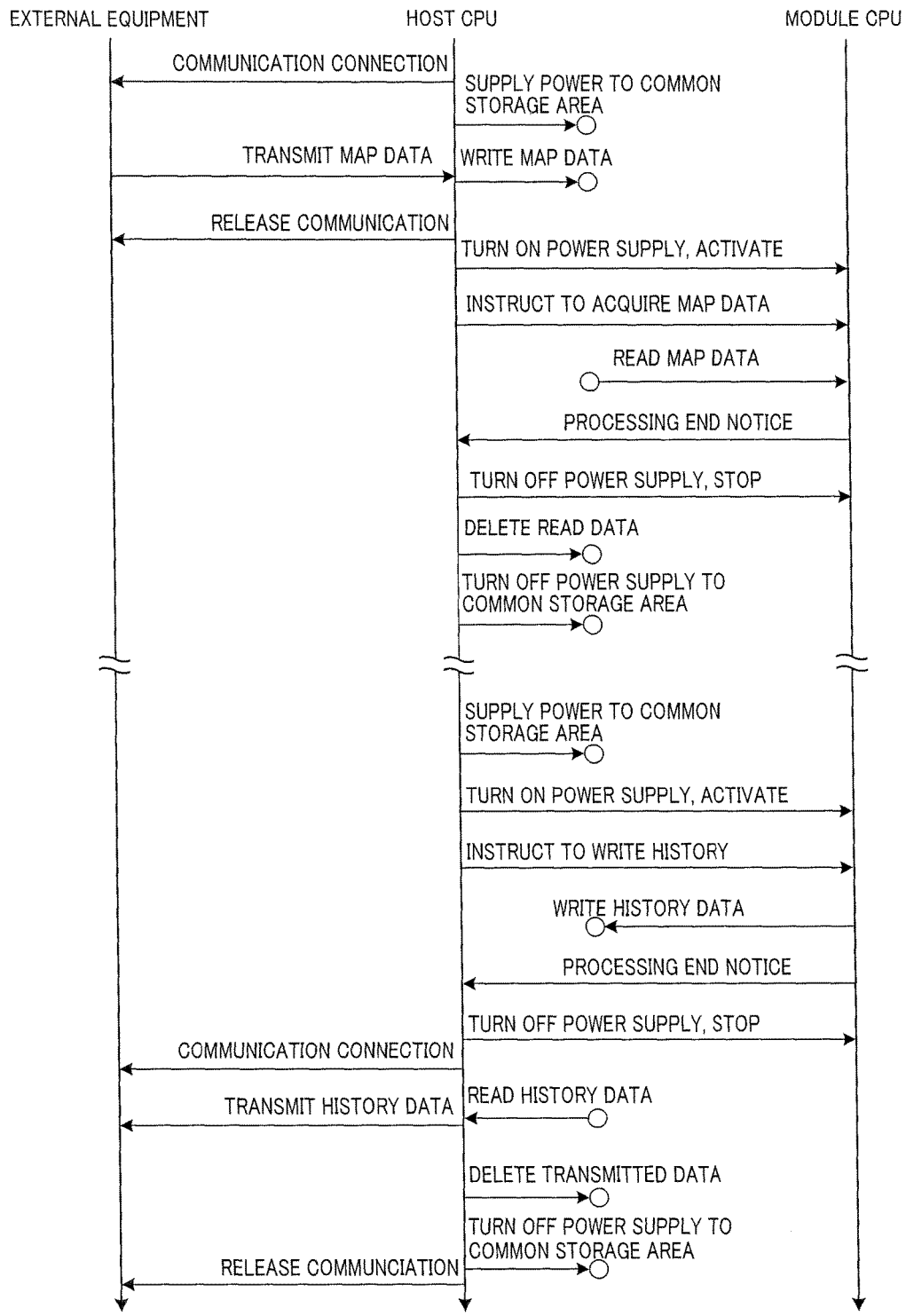

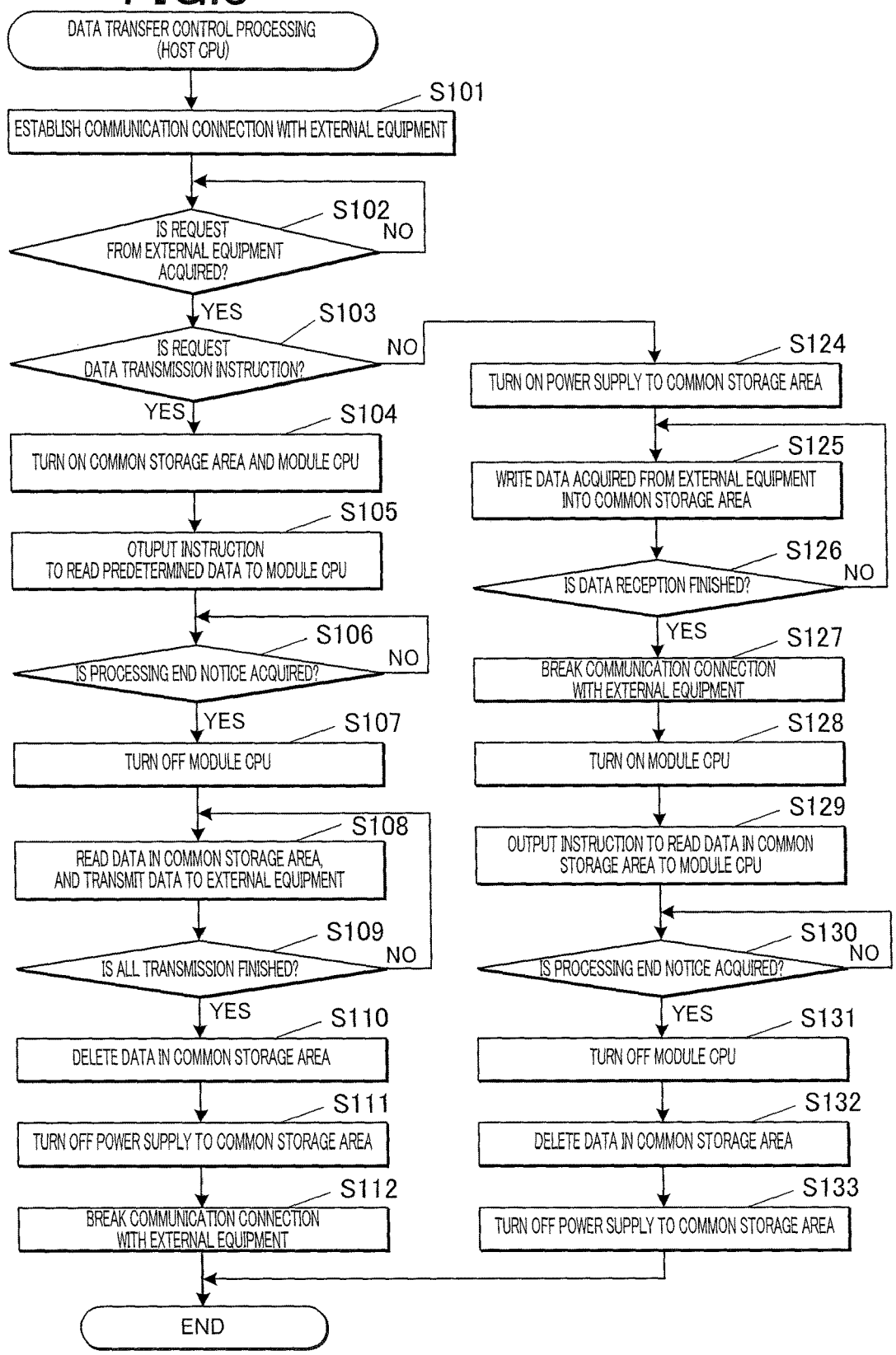

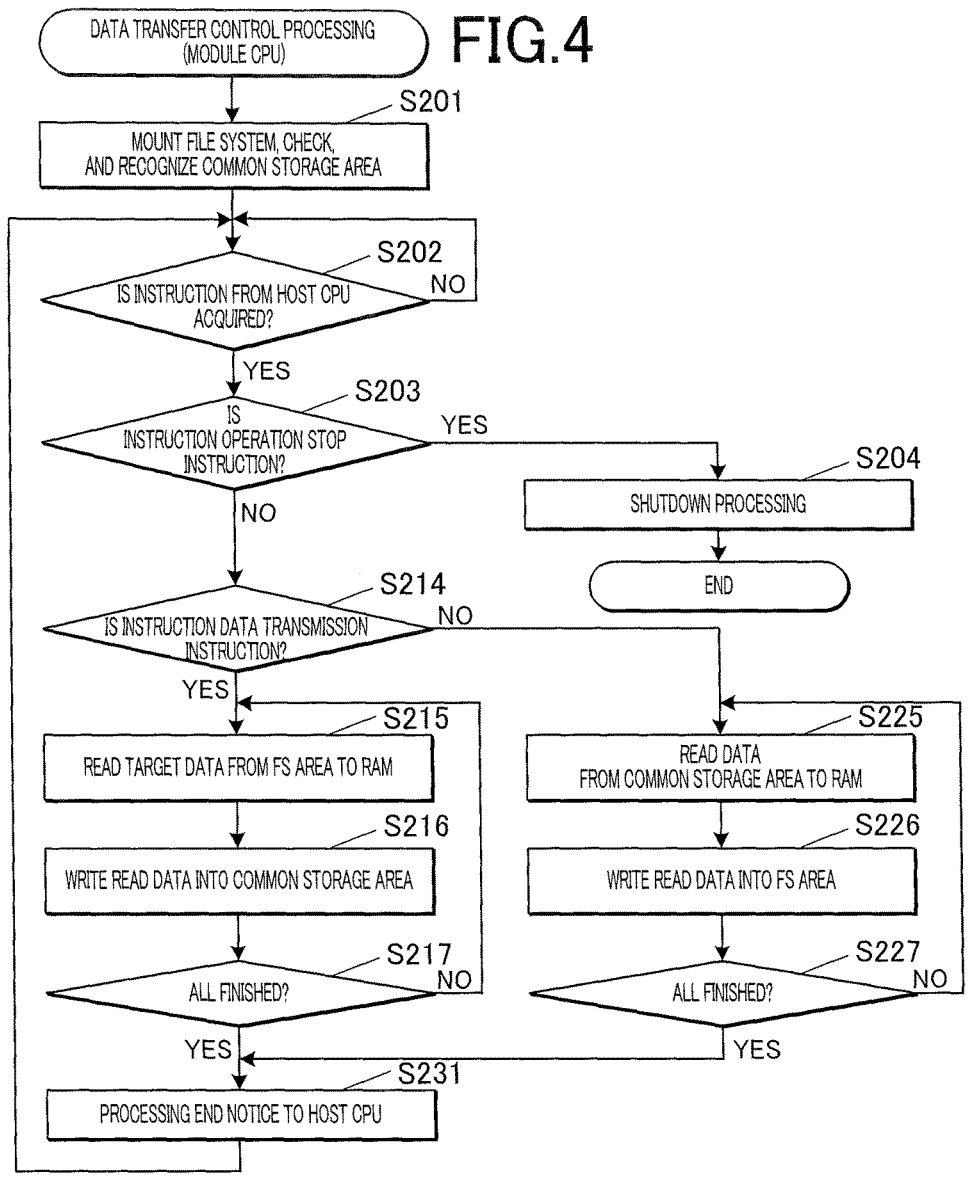

CONTROL DEVICE, ELECTRONIC TIMEPIECE, PROCESSING CONTROL METHOD AND COMPUTER READABLE STORAGE MEDIUM

CROSS-REFERENCE TO RELATED APPLICATIONS

The entire disclosure of Japanese Patent Application No. 2016-185063, filed on Sep. 23, 2016 including description, claims, drawings and abstract is incorporated herein by reference in its entirety.

BACKGROUND OF THE INVENTION

1. Field of the Invention

The present invention relates to a control device, an electronic timepiece, a processing control method and a computer readable storage medium for performing processing control by a plurality of control sections.

2. Description of Related Art

Conventionally, there has been a technique of providing a plurality of control sections having CPUs (Central Processing Units) and performing distributed processing for the purpose of achieving efficient and high-speed processing. There has been known a technique in which, after activation of a CPU in a computer or a computer system using the above technique, the CPU stores boot information of another CPU or the like in a region readable by the another CPU, activates the another CPU and thereby performs setting management at the time of activation (for example, see Japanese Patent Application Laid Open Publication No. 2007-206885).

Generally, in a case where there is provided a plurality of control sections which has processing capabilities respectively corresponding to processing contents having large differences in processing load, it is not efficient to continuously operate the plurality of control sections regardless of the implementation state of processing. Thus, when high-load processing is not performed, it is preferable to stop the operation of a control section having a high processing capability (large power consumption).

However, though it is preferable to perform data storage and management by the control section having the high processing capability in order to achieve efficient and high-speed data access according to the operation of the control section having the high processing capability, there has been a problem in the data access by a control section having a low processing capability while the operation of the control section having the high processing capability is stopped.

An object of the present invention is to provide a control device, an electronic timepiece, a processing control method and a computer readable storage medium enabling both of appropriate data access and efficient operation of a plurality of control sections.

SUMMARY OF THE INVENTION

In order to achieve at least one of the above objects, there is provided a control device, including: a first processor; a second processor which has a higher performance than the first processor; and a storage in which data is stored so as to be readable and writable by the second processor, wherein a part of the storage is usable as a common storage area which is readable and writable by the first processor and the second processor, in reading operation, the second processor reads first data from out of the common storage area in the storage and writes the first data to the common storage area, and the first processor reads the first data from the common storage area, and in writing operation, the first processor writes second data to the common storage area, and the second processor stores the second data out of the common storage area in the storage.

BRIEF DESCRIPTION OF THE DRAWINGS

The above and other objects, advantages and features of a preferred embodiment will become more fully understood from the detailed description given hereinafter and the appended drawings which are given by way of illustration only, and thus are not intended as a definition of the limits of the present invention, and wherein:

FIG. 2 is a sequence diagram showing an operation procedure of a host CPU and a module CPU regarding data transfer;

FIG. 3 is a flowchart showing a control procedure by the host CPU of data transfer control processing;

FIG. 4 is a flowchart showing a control procedure by the module CPU of the data transfer control processing;

FIG. 5A is a view showing an example of memory use in a case where apart of a file system region is a transfer region;

FIG. 5B is a view showing an example of memory use in a case where apart of a file system region is a transfer region; and FIG. 5C is a view showing an example of memory use in a case where apart of a file system region is a transfer region.

DETAILED DESCRIPTION OF THE PREFERRED EMBODIMENT

Figure 1:
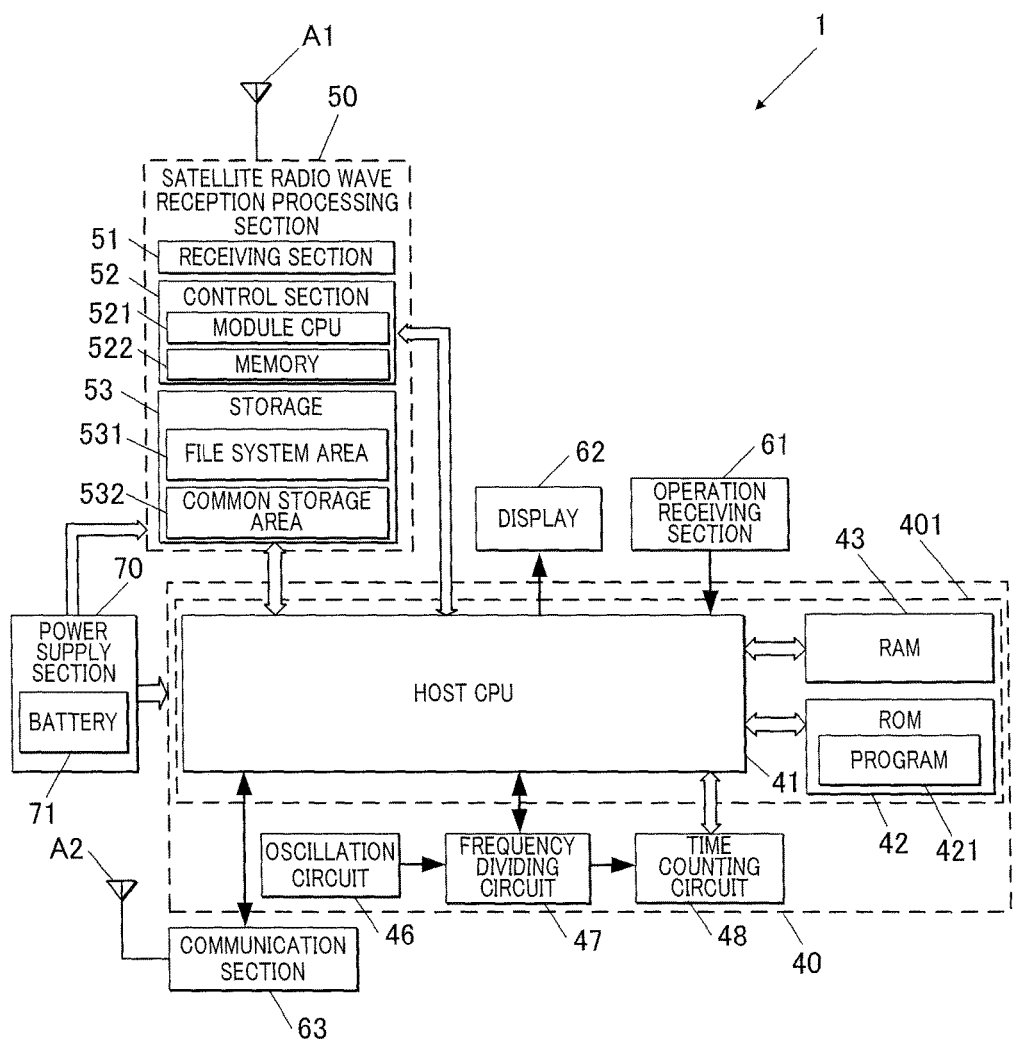
FIG. 1 is a block diagram showing a functional configuration of an electronic timepiece in an embodiment of the present invention.

Hereinafter, an embodiment of the present invention will be described with reference to the drawings.

FIG. 1 is a block diagram showing a functional configuration of an electronic timepiece 1 in the embodiment.

The electronic timepiece 1 includes a microcomputer 40, a satellite radio wave reception processing section 50, an antenna A1, an operation receiving section 61, a display 62, a communication section 63, an antenna A2, a power supply section 70 and such like.

The microcomputer 40 includes a host CPU 41 (Central Processing Unit), a ROM 42 (Read Only Memory), a RAM 43 (Random Access Memory), an oscillation circuit 46, a frequency dividing circuit 47, a time counting circuit 48 (counter) and such like.

A control section 401 (first processor) is configured by including the host CPU 41, the ROM 42 and the RAM 43 and performs a control operation.

The host CPU 41 performs various types of arithmetic processing. The arithmetic processing performed by the host CPU 41 is processing mainly regarding count and display of date and time as a timepiece of the electronic timepiece 1 and is continuously and repeatedly performed over a long period with a low load. According to the processing, the host CPU 41 has a performance which is lower than that of a module CPU 521 included in a satellite radio wave reception processing section 50.

The ROM 42 stores a program 421 for the host CPU 41 to execute various types of processing operation, initial setting data and such like. As the ROM 42, there may be provided a nonvolatile memory such as a flash memory capable of rewriting and updating data in addition to a mask ROM. The RAM 43 provides a working memory space to the host CPU 41 and stores temporary data.

The oscillation circuit 46 generates and outputs signals of a predetermined frequency. A crystal oscillator or the like is used for generating signals, for example. The crystal oscillator may be externally provided with respect to the microcomputer 40.

The frequency dividing circuit 47 outputs a frequency dividing signal acquired by dividing, with a set frequency dividing ratio, the frequency signal input from the oscillation circuit 46. The setting of the frequency dividing ratio may be changed by the host CPU 41.

The time counting circuit 48 counts and stores the current date and time by counting the frequency dividing signal of the predetermined frequency which was input from the frequency dividing circuit 47. The current date and time counted by the time counting circuit 48 can be corrected (controlled) by a control signal from the host CPU 41 on the basis of the accurate current date and time acquired by the satellite radio wave reception processing section 50 or the like. The time counting circuit 48 may be hardware such as a counter, or the host CPU 41 may perform the counting operation of the time counting circuit 48 with software by using the RAM 43.

The satellite radio wave reception processing section 50 is a module configured mainly for performing processing of receiving radio waves (satellite radio waves) transmitted from a positioning satellite (satellite) in a satellite positioning system such as the GPS (Global Positioning System) of US via the antenna A1, acquiring date and time information (current date and time information) and information regarding the position of the positioning satellite (orbit information such as ephemeris and positional and speed information), performing positioning to calculate the accurate current date and time and current position, and outputting them to the host CPU 41. The satellite radio wave reception processing section 50 includes a receiving section 51, a control section 52 (second processor), a storage 53 and such like, and the sections are integrally formed as an LSI. The satellite radio wave reception processing section 50 can include an oscillation circuit and a frequency dividing circuit (not shown in the drawings), especially a circuit which has an oscillation frequency higher than that of the oscillation circuit 46, separately from the oscillation circuit 46 and the frequency dividing circuit 47.

The receiving section 51 receives and detects radio waves from a positioning satellite which is a reception target, identifies the positioning satellite and the phase of transmission signal, tracks the radio waves from the identified positioning satellite and continuously demodulates and acquires signals.

The control section 52 mainly performs reception control of the satellite radio waves and processing (reception processing) such as identification of the current date and time and calculation of the current position (that is, positioning) based on the received signal (reception data). The control section 52 can also perform other processing on the basis of instructions from the host CPU 41. The control section 52 includes a module CPU 521, a memory 522 and such like.

The module CPU 521 performs various types of arithmetic processing, and controls the operation of the satellite radio wave reception processing section 50. The module CPU 521 (control section 52) has an performance which is higher than that of the host CPU 41 (control section 401), and can execute processing, such as the above-mentioned positioning calculation, which is high load compared with the counting and display operation of date and time. According to this, the power consumption of the module CPU 521 is larger than the power consumption of the host CPU 41 in a case where the host CPU 41 performs corresponding processing of a same degree. The module CPU 521 and the host CPU 41 are connected to each other by a connection having a good efficiency of power consumption such as I²C bus.

The memory 522 has a volatile memory such as a DRAM and a SRAM providing a working memory space (including a cash memory) to the module CPU 521, a ROM for storing initial setting data and such like. The ROM may be a nonvolatile memory which is rewritable and updatable in addition to a mask ROM. Here, the capacity of the volatile memory of the memory 522 is larger than the capacity of the RAM 43, and the power consumption according to refresh operation or the like is also large according to the capacity.

The storage 53 is an auxiliary storage device and stores various types of setting data, history data, programs and such like which are to be stored regardless of the power supply state. A flash memory or the like is used as the storage 53, and the storage 53 has a file system region 531 and a common storage area 532.

In the file system region 531 (region outside of the common storage area 532), the control section 52 performs operation management of data by a predetermined file system on the basis of a predetermined OS (Operating System), and the module CPU 521 reads and writes data on the basis of the management information during operation of the control section 52. This enables efficient data storage and rapid data reading and writing during the operation of the module CPU 521. In the file system region 531, there are stored timing information regarding when the date and time was acquired and positioning was performed, history data (predetermined information on positioning result) of the position acquired as a result of the positioning, and such like. A known system can be appropriately selected as the type of file system according to the type of OS and such like.

The common storage area 532 is connected to the host CPU 41 and the module CPU 521 by using an SPI bus or the like as a serial flash memory, and can be accessed (read and written) from either of the host CPU 41 and the module CPU 521. Generally, the storage capacity of the storage 53 is sufficiently larger than the storage capacity of the RAM 43. The storage 53 may be externally provided instead of being integrally formed in the satellite radio wave reception processing section 50. The common storage area 532 is used for transferring data in a case where the host CPU 41 operates the data which is to be read and written in the file system region 531.

The satellite radio wave reception processing section 50 can switch the on/off of supply of the electric power and the clock signal for each of three blocks of the receiving section 51, control section 52 and file system region 531, and common storage area 532. That is, when reception operation of satellite radio waves is not performed, electric power is not supplied to the receiving section 51 so as not to operate the receiving section 51, and when the host CPU 41 accesses the common storage area 532 only, electric power is supplied to the common storage area 532 and electric power and clock signal are not supplied to the control section 52 and the file system region 531.

The operation receiving section 61 receives an input operation from the outside such as user's operation. The operation receiving section 61 includes one or a plurality of push button switches, for example, and outputs a signal corresponding to the pressing operation of the push button switch to the host CPU 41.

The display 62 performs display operation of various types of information on the basis of control by the host CPU 41. The display 62 has a display screen and a drive circuit thereof. A liquid crystal display screen (LCD) is used as the display screen, for example, and the drive circuit performs drive operation of display by the liquid crystal display screen. The contents displayed on the display 62 include information on the current date and time (that is, display of date and time).

The communication section 63 performs communication operation, the near field communication in the embodiment, with other external electronic equipment via the antenna A2 on the basis of control (operation control) by the host CPU 41. As the near field communication, there is Bluetooth communication (registered trademark: Bluetooth), for example. As other electronic equipment, there are a smartphone, a mobile phone, various portable electronic terminals and such like of a same user. The communication section 63 can acquire operation information of positioning satellite, data on local time setting, map image data, route data such as a navigation route on a map and such like via the electronic equipment which is the destination of the communication connection, for example.

The power supply section 70 supplies electric power required for operation of the sections in the electronic timepiece 1 to the respective sections. The power supply section 70 supplies electric power output from the battery 71 at operation voltages of respective sections. In a case where the operation voltage is different by the operation site, the power supply section 70 performs voltage conversion by using a regulator and outputs the converted voltage. As the battery 71, the power supply section 70 may include a solar panel generating power corresponding to incident light, a secondary battery storing the generated electric power and such like, and a dry cell, a rechargeable battery and such like may be detachably provided to the power supply section 70.

A control device (computer) is configured by including the microcomputer 40 and the control section 52 and the storage 53 of the satellite radio wave reception processing section 50 among the above configurations. The control device can include the communication section 63.

Next, data transfer operation executed in the electronic timepiece 1 in the embodiment will be described.

Here, the description is made for a case of acquiring map data from external equipment and a case of outputting history of the current position acquired from the positioning satellite to the external equipment.

FIG. 2 is a sequence diagram showing the operation procedure of the host CPU 41 and the module CPU 521 regarding data transfer.

In a case of acquiring map data from external equipment, the host CPU 41 establishes communication connection with the external equipment (such as a smartphone), starts power supply to the common storage area 532, thereafter acquires data transmitted from the external equipment, and sequentially writes and stores the data in the common storage area 532. When data transmission from the external equipment is finished, the host CPU 41 cancels the communication connection. The host CPU 41 may temporarily store the received data in a buffer region such as the RAM 43 and then transfer the received data to the common storage area 532.

The host CPU 41 starts power supply to the module CPU 521, and outputs an acquisition instruction of map data to the activated module CPU 521. When the module CPU 521 detects the acquisition instruction, the module CPU 521 accesses the common storage area 532 to read the map data and writes the map data to the file system region 531 via a RAM of the memory 522 as needed.

When the writing of the map data to the file system region 531 is finished, the module CPU 521 outputs a processing end notice to the host CPU 41. The host CPU 41 outputs an instruction to end the operation to the module CPU 521, turns off the power supply to the module CPU 521 after the operation of module CPU 521 is stopped, and thereby turns off the module CPU 521. The module CPU 521 cancels (deletes) the read map data from the common storage area 532, and thereafter turns off the power supply to the common storage area 532 to stop the operation.

On the other hand, in a case of outputting the history data stored in the file system region 531 to the external equipment, the host CPU 41 supplies electric power to the common storage area 532 to start the operation, and start power supply to the module CPU 521 to activate the module CPU 521. The host CPU 41 outputs a writing instruction of history data to the activated module CPU 521.

When the writing instruction is detected, the activated module CPU 521 reads the history data from the file system region 531, and writes the data to the common storage area 532 via a RAM of the memory 522 as needed. When the writing operation is finished, the module CPU 521 outputs a processing end notice to the host CPU 41.

The host CPU 41 outputs an operation stop instruction to the module CPU 521, and turns off power supply after the stop of operation. Next, the host CPU 41 establishes the communication connection with external equipment. In accordance with the instruction from the external equipment or a request from the host CPU 41, the host CPU 41 reads the history data via the RAM 43 as needed and transmits the data to the external equipment.

When the transmission of all the history data is finished, the host CPU 41 cancels (deletes) the data in the common storage area 532 and turns off the power supply to the common storage area 532. The host CPU 41 breaks the communication connection with the external equipment.

FIG. 3 is a flowchart showing a control procedure by the host CPU 41 (control section 401) of data transfer control processing executed in the electronic timepiece 1 in the embodiment.

When the host CPU 41 (control section 401) starts the data transfer control processing, the host CPU 41 (control section 401) establishes the communication connection with the external equipment (step S101). The host CPU 41 determines whether a signal of an operation request from the external equipment was acquired (detected) (step S102). If it is not determined that the signal was acquired (step S102: NO), the host CPU 41 repeats the processing of step S102.

If it is determined that the signal of an operation request was acquired (step S102: YES), the host CPU 41 determines whether the acquired signal is a data transmission instruction to the external equipment (step S103). If it is determined that the acquired signal is the data transmission instruction (step S103: YES), the processing of the host CPU 41 proceeds to step S104. If it is not determined that the acquired signal is the data transmission instruction, here, if the acquired signal is a reception instruction of data transmitted from the external equipment (step S103: NO), the processing of the host CPU 41 proceeds to step S124.

When it is determined that the acquired signal is the data transmission instruction and the processing proceeds to the processing of step S104, the host CPU 41 starts power supply to the common storage area 532 and the module CPU 521 (control section 52 and storage 53 in the satellite radio wave reception processing section 50), and starts (activates) the operation (step S104). The host CPU 41 outputs an instruction to read transmission target data (first data) to the activated module CPU 521 (step S105).

The host CPU 41 stands by for a signal from the module CPU 521, and determines whether a processing end notice was acquired (step S106). If it is not determined that the processing end notice was acquired (step S106: NO), the host CPU 41 repeats the processing of step S106.

If it is determined that the processing end notice was acquired (step S106: YES), the host CPU 41 outputs an instruction to stop the operation of the module CPU 521 (control section 52 and the file system region 531 managed by the module CPU 521) to the module CPU 521 to cause the module CPU 521 to perform shutdown operation, stops the power supply after the stop of operation, and thereby turns off (ends the operation) the module CPU 521 (step S107).

The host CPU 41 reads the data in the common storage area 532 in order, and transmits (outputs) the read data to the external equipment in parallel with the reading (step S108). The host CPU 41 determines whether all the data was read and the transmission was finished (step S109). If it is determined that the transmission has not yet been finished (step S109: NO), the processing of the host CPU 41 returns to step S108.

If it is determined that all the data was acquired (after acquisition) and transmission of all the data was finished (step S109: YES), the host CPU 41 deletes (deletion operation) all the data of the common storage area 532 (step S110). The host CPU 41 turns off the power supply to the common storage area 532 to stop the operation (step S111). The host CPU 41 breaks the communication connection with the external equipment (step S112). The host CPU 41 ends the data transfer control processing.

The reading control operation is configured by including the processing of steps S104 to S108 (reading control section), and the reading control operation can include the processing of steps S109 to S112.

On the other hand, if it is determined that the data transmission instruction was not acquired (data receiving instruction was acquired) in the determination processing of step S103, and the processing proceeds to step S124, the host CPU 41 supplies electric power to only the common storage area 532 in the satellite radio wave reception processing section 50 and starts the operation (step S124).

The host CPU 41 writes data (second data), which was sequentially received and acquired via the communication section 63 from the external equipment, to the common storage area 532 in order via the RAM 43 as needed in parallel with the receiving and acquiring (step S125). The host CPU 41 determines whether the reception of all the data was finished (step S126), and if it is not determined that the reception was finished (step S126: NO), the processing returns to step S125.

If it is determined that reception of all the data was finished (step S126: YES), the host CPU 41 breaks the communication connection with the external equipment (step S127). The host CPU 41 starts the power supply to the module CPU 521 (control section 52 and file system region 531 managed by the module CPU 521) to activate the module CPU 521 (step S128).

The host CPU 41 outputs an instruction to read and acquire the data stored in the common storage area 532 to the activated module CPU 521 (step S129). The host CPU 41 stands by for the signal from the module CPU 521, and determines whether the processing end notice of data reading was acquired from the module CPU 521 (step S130). If it is not determined that the processing end notice was acquired (step S130: NO), the host CPU 41 repeats the processing of step S130.

If it is determined that processing end notice of data reading was acquired (step S130: YES), the host CPU 41 outputs an operation stop instruction to the module CPU 521 to perform shutdown operation. Thereafter, the host CPU 41 turns off the power supply to the module CPU 521 after stop of the operation of the module CPU 521, and thereby turns off the module CPU 521 (control section 52 and file system region 531) (step S131).

The host CPU 41 deletes (deletion operation) all the data which was written to the common storage area 532 (step S132), and turns off the power supply to the common storage area 532 (step S133). Then, the host CPU 41 ends the data transfer control processing.

The writing control step is configured by including the processing of steps S124 to S129 (writing control section), and the writing control step can include the processing of steps S130 to S133.

FIG. 4 is a flowchart showing a control procedure by the module CPU 521 of data transfer control processing executed in the electronic timepiece 1 in the embodiment.

When the module CPU 521 is activated, the module CPU 521 first performs system check by mounting the file system region 531. The module CPU 521 recognizes the common storage area 532 and performs setting processing (step S201).

The module CPU 521 stands by for input of an instruction from the host CPU 41 and determines whether the instruction was acquired (step S202). If it is not determined that the instruction was acquired (step S202: NO), the module CPU 521 repeats the processing of step S202.

If it is determined that the instruction from the host CPU 41 was acquired (step S202: YES), the module CPU 521 determines whether the acquired instruction is an operation stop instruction (step S203). If it is determined that the acquired instruction is the operation stop instruction (step S203: YES), the module CPU 521 performs shutdown operation (step S204) to stop the operation and ends the data transfer control processing.

If it is not determined that the acquired instruction is the operation stop instruction (step S203: NO), the module CPU 521 determines whether the acquired instruction is a data transmission instruction of data stored in the file system region 531 (step S214). If it is determined that the acquired instruction is data transmission instruction (step S214: YES), the module CPU 521 reads the reading target data from the file system region 531 to the RAM of the memory 522 (step S215), and writes the read data to the common storage area 532 in order (step S216).

The module CPU 521 determines whether reading and writing to the common storage area 532 of all the data are finished (step S217). If it is not determined that the reading and writing are finished (step S217: NO), the processing of module CPU 521 returns to step S215. If it is determined that the reading and writing are finished (step S217: YES), the module CPU 521 outputs the processing end notice to the host CPU 41 (step S231). The processing of the module CPU 521 returns to step S202.

In the determination processing of step S214, if it is not determined that the acquired instruction is the data transmission instruction, that is, here, if it is determined that the instruction is a data acquisition instruction from the external equipment (step S214: NO), the module CPU 521 accesses the common storage area 532, reads the stored data in order and writes the data to the RAM of the memory 522 (step S225). The module CPU 521 further writes the data written in the RAM to the file system region 531 (step S226). The module CPU 521 determines whether reading from the common storage area 532 and writing to the file system region 531 of all the data are finished (step S227), and if it is not determined that the reading and writing are finished (step S227: NO), the processing returns to step S225. If it is determined that the reading and writing are finished (step S227: YES), the module CPU 521 shifts the processing to step S231.

Modification Example

Next, a modification example of an electronic timepiece 1 in the embodiment will be described.

In the above embodiment, a serial flash memory which is separate from the file system region 531 is provided as the common storage area 532. However, a part of the file system region 531 can be temporarily determined as a data transfer region between the module CPU 521 and the host CPU 41.

FIGS. 5A to 5C are views showing examples of memory use in a case where a part of the file system region 531 is a transfer region.

As shown in FIG. 5A, the module CPU 521 normally stores data so as to be appropriately distributed to positions on the memory by block unit by the operation of OS in the file system region 531, and connects the distributed data to use the data by using logical address. In a case where a part of the file system region 531 is used as the data transfer region, by specifying a head physical address in the memory, it is possible to read and write data as serial data in the address order from the physical address by either one of the module CPU 521 and the host CPU 41 even if there is no management information regarding the file system. As the storage 53, an NOR type flash memory which is easy to sequentially access is preferably used.

When writing and updating of data are repeatedly performed by using the file system by the operation of OS, the file is gradually fragmented on the physical address, and free memory is also fragmented, making it difficult to continuously write the transfer data on the physical address. Thus, in the electronic timepiece 1, as shown in FIG. 5B, defragmentation is performed in advance at the time of operation of the module CPU 521 and secures a continuous free memory. The defragmentation is a setting performed by each of a predetermined time period, the number of activations or activation time of the module CPU 521, or the like, for example. In addition to these settings, it is possible to further determine that the defragmentation is performed after a predetermined operation, for example, acquisition processing of date and time by radio wave reception from the positioning satellite in a state in which these conditions are satisfied. The optimization may not necessarily be performed for the entire file system region 531 as long as the defragmentation is performed for the range enabling minimum writing of transfer data. Various known algorithms can be used as the algorithm of defragmentation.

Here, the defragmentation is performed so as to continuously release the fourth line, and transfer data "t" is written continuously to the memory addresses on the fourth line as shown in FIG. 5C. In a case where the writing position is fixed, the address is not especially necessary between the host CPU 41 and the module CPU 521. Also in a case where the writing position is not fixed, reading and writing are possible without using the file system as long as the physical address or information on a bite number indicating the head of writing is transferred.

As described above, a control device included in an electronic timepiece 1 in the embodiment includes a control section 401 which includes a host CPU 41, a control section 52 in a satellite radio wave reception processing section 50 which has a higher performance than that of the control section 401, and a storage 53 in which data is stored so as to be readable and writable by the control section 52. A part of the storage 53 can be used as a common storage area 532 which is readable and writable by the control section 401 in a microcomputer 40 and the control section 52 in the satellite radio wave reception processing section 50. In data reading operation, the control section 52 reads first data from out of the common storage area 532 (file system region 531) in the storage 53 and writes the read data to the common storage area 532, and the control section 401 reads the first data from the common storage area 532. In writing operation, the control section 401 writes second data to the common storage area 532, and the control section 52 stores the second data out of the common storage area 532 (file system region 531) in the storage 53.

Thus, while the data transfer is performed between the control section 401 (host CPU 41) and the control section 52 (module CPU 521), data can be transferred without constantly operating the module CPU 521. Thus, it is possible to activate the module CPU 521 at an appropriately timing to perform high-load processing rapidly, and cause the host CPU 41 to rapidly acquire the data obtained by the high-load processing. Especially, since the module CPU 521 can perform efficient high-speed management of large capacity data using a file system or the like, it is possible to improve the efficiency of processing by the module CPU 521 and the use of storage device. Since the module CPU 521 and the file system region 531 do not need to be operated more than necessary, the power consumption is reduced. Especially, the power consumption can be reduced more effectively since the power consumption is generally larger for a CPU having a higher performance and a memory having a larger capacity according to the CPU than a CPU having a lower performance and a memory having a smaller capacity.

Accordingly, the control device enables both of appropriate data access and efficient operation of the control sections 52 and 401.

The control section 52 stops the operation during at least a part of each of the period when the control section 401 reads the first data stored in the common storage area 532 and the period when the control section 401 writes second data to the common storage area 532. Since it is not necessary to operate the control section 52 (module CPU 521) to perform operation management of the storage 53 over a period when the control section 401 (host CPU 41) possibly accesses the storage 53, the power consumption can be reduced.

The region outside the common storage area 532 in the storage 53 is operated and managed as the file system region 531 using a predetermined file system by the control section 52. Accordingly, the control section 52 can efficiently store data in a storage (storage) and rapidly access to the data.

A serial flash memory is used for the common storage area 532. Thus, data transfer can be performed with the control section 52 and the control section 401 at a reasonable transfer speed of a degree which is low power consumption and not too late. Thus, it is possible to perform data transfer appropriately while avoiding the delay which is an obstacle of data access, and to divide processing between the control section 52 and the control section 401 to perform the processing efficiently.

After the first data is read and after the control section 52 stores the second data out of the common storage area (file system region 531), the control section 401 performs the deletion operation of data stored in the common storage area 532. Thus, it is possible to always acquire transfer target data uniformly and easily without considering the remaining amount of old data. Since deletion is not necessary before the writing, unnecessary delay is not generated at the time of writing operation.

The communication section 63 which performs communication with the outside is provided, and the communication operation by the communication section 63 is controlled by the control section 401. In such a way, the control section 401 which continuously operates controls the operation of the communication section 63 requiring time and not having a high processing load compared to arithmetic processing. Thereby, it is not necessary to continuously operate the control section 52 which has large power consumption over a time period requiring communication even when the communication operation is related to the processing contents of the control section 52. Thus, it is possible to reduce power consumption and operate the control sections 401 and 52 more efficiently.

The control section 401 outputs the first data which was stored in the file system region 531 to the outside via the communication section 63, and acquires second data to be stored in the file system region 531 from the outside. In such a way, during the communication at a low data transfer speed, data transfer can be performed by control of the control section 401 without operating the control section 52 and the file system region 531. The processing efficiency can be improved by the control section 52 rapidly performing all of the data movement (duplication) between the common storage area 532 and the file system region 531.

The control section 401 performs, in parallel, reading of the first data from the common storage area 532 and output to the outside, and performs, in parallel, acquisition of the second data from the outside and writing to the common storage area 532. By the control section 401 performing, in parallel, the communication control and the control of access to the common storage area 532 without operating the control section 52 and the file system region 531, it is possible to shorten the operation time of the control section 52 and the file system region 531 and perform efficient processing while appropriately dispersing the load on the control section 401.

The electronic timepiece 1 in the embodiment includes the above-mentioned control device, a time counting circuit 48 which counts the current date and time, and a display 62 which performs display of date and time based on the current date and time counted by the time counting circuit 48. The display operation by the display 62 is controlled by the control section 401. That is, since the control section 401 controls the operation of display 62 which performs display of date and time to be continuously maintained, the control section 52 may not be operated more than necessary and, in a case where there is a large load in generating an image as a display target or the like, the control section 52 may be temporarily operated to perform image generation processing and the generated image data may be acquired as mentioned above. Thus, it is possible to smoothly perform data transfer regardless of the operation state of the control section 52 while operating the control sections 401 and 52 to appropriately perform processing corresponding to respective characteristics of the control sections 401 and 52 by distributing the processing.

The satellite radio wave reception processing section 50 which performs reception processing of satellite radio waves including current date and time information is provided, and the control section 52 acquires the current date and time information by controlling the operation of the satellite radio wave reception processing section 50. In such an electronic timepiece which causes a separate control section 52 to perform reception processing of the satellite radio waves which is high load compared to the display and counting of date and time, it is possible to share the processing with the control section 401 efficiently by appropriately operating the control section 52 according to the load of processing, and perform data transfer smoothly. Thus, it is possible to stably perform temporary high-load processing without providing an excess load and a bad influence to the time counting operation and the display operation of date and time in the electronic timepiece 1, and perform data transfer according to the high-load processing.

The satellite radio waves received by the satellite radio wave reception processing section 50 include information (satellite orbit information and positional and speed information) regarding the position of the positioning satellite transmitting the radio waves. The control section 52 performs positioning on the basis of the reception data received by the satellite radio wave reception processing section 50 and stores predetermined information regarding the positioning result, here, history data of the current position as first data in the common storage area 532. In such a way, acquisition data (processing data) by the satellite radio wave reception processing section 50 can be smoothly output with a low load to the control section 401 (host CPU 41) and the outside via the common storage area 532 without continuing the operation of the satellite radio wave reception processing section 50 and the file system region 531 more than necessary. Thus, it is possible to acquire, use and output the positioning data more effectively while stably maintaining the counting and display of the date and time in the electronic timepiece 1.

By using a control processing method of reading data from the file system region 531 in the above-mentioned reading control step and writing data to the file system region 531 in the writing control step, it is possible to limit the operation of the control section 52 and the file system region 531 within necessary ranges and smoothly perform data transfer between the control section 52 and the control section 401 while maintaining the stable operation without putting an excess load on the control section 401. Thus, in a control device including a plurality of control sections which have different performance, the control sections 52 and 401 can be efficiently operated while enabling appropriate data access.

For control of the computer (electronic timepiece 1), there may be installed and used a program 421 which causes the control section 401 to function as a reading control section which causes the control section 52 to write, in the common storage area 532, first data which was stored outside the common storage area 532 (file system region 531) in the storage 53 and reads the first data from the common storage area 532, and as a writing control section which writes second data to the common storage area 532 and causes the control section 52 to store the second data outside the common storage area 532 (file system region 531) in the storage 53. Thus, it is possible to efficiently operate the control sections 52 and 401 while easily enabling appropriate data access by the control sections 401 and 52.

The present invention is not limited to the above embodiment, and various changes can be made.

For example, in the embodiment, the control section 401 (host CPU 41) performs instruction to activate the control section 52 (module CPU 521) as needed to perform writing and reading operation of data. However, the control section 52 may spontaneously write data to the common storage area 532 at the time of activation so as to be acquired by the control section 401.

In a case where the contents, format, size and usage of data to be transferred are determined, specification is not necessary for the determined points. That is, in a case where all the points are determined, simply, the contents written to the common storage area 532 by one control section may be periodically detected and acquired by another control section.

A plurality of module CPUs 521 and storages 53 may be provided according to the number of modules or the like, and each of them can perform data transfer using the common storage area 532 with the host CPU 42. In this case, the common storage area 532 may be provided individually or a plurality of module CPUs 521 may share common storage areas of the number less than the number of modules.

The embodiment has been described for a case where reading of data in the file system region and writing of data to the file system region are performed in parallel with data acquisition and transfer by communication with the outside, respectively. However, such reading and writing operations are not limited to the case of performing processing in parallel with communication with the outside. The reading and writing operations may be performed in parallel with simple data transfer with the host CPU 41 and other processing by the host CPU 41. For example, the display contents by the display 62 may be processed by the module CPU 521, and the processed data may be acquired by the host CPU 41 so as to be sequentially used as display control data by the display 62.

In the embodiment, an NOR type flash memory which is capable of sequential access is used as the common storage area. However, the present invention is not limited to this as long as the memory itself is a storage device which can manage stored data and does not need management of the module CPU 521.

The embodiment has been described by taking, as an example, a case where the electronic timepiece 1 has the satellite radio wave reception processing section 50. However, the present invention is not limited to this. In a case of having any other module capable of high-load processing, for example, in a case where a sampling rate of measurement value by a physical sensor included in the module is high or arithmetic processing using the measurement value of the physical sensor is complicated, the present invention can also be applied to data transfer and power consumption control when the CPU and the storage device of the module perform high-load processing.

The embodiment has been described by taking, as an example, the electronic timepiece 1. However, the present invention is not limited to this. The present invention can be applied to electronic equipment in which a plurality of control sections having different performance is provided and basic operation is continuously controlled by a control section (such as microcomputer) having a low performance, especially a portable type of electronic equipment, such as an activity amount meter, which is limited in power consumption.

The embodiment has been described for an example of using the ROM 42 formed of a mask ROM, a nonvolatile memory or the like as a computer readable medium of the program 421 according to the present invention. However, the present invention is not limited to this example. An HDD (Hard Disk Drive) or a portable recording medium such as a CD-ROM and a DVD disk can be applied as another computer readable medium. A carrier wave is also applied as the medium for providing program data according to the present invention via a communication line.

As for the other specific details of the configurations, control contents, procedures and such like shown in the embodiment, modifications can be appropriately made within the scope of the present invention.

Though the embodiment of the present invention has been described above, the scope of the present invention is not limited to the above embodiment, and includes the scope of inventions, which is described in the scope of claims, and the scope equivalent thereof.

What is claimed is:

1. A control device comprising:
   a first processor;
   a second processor which has a higher performance than the first processor; and
   a storage comprising:
      a first storage area configured to be readable and writable by the second processor; and
      a second storage area that is a common storage area configured to be readable and writable by the first processor and the second processor,
   wherein in a reading operation:
      the first processor is configured to start power supply to the second processor to activate the second processor;
      upon activation of the second processor, the second processor is configured to read first data from the first storage area of the storage and write the first data to the common storage area of the storage; and
      upon completion of writing of the first data to the common storage area of the storage by the second processor, the first processor is configured to:
         stop power supply to the second processor to deactivate the second processor; and
         read the first data from the common storage area of the storage, and
   wherein in a writing operation,
      the first processor is configured to write second data to the common storage area of the storage;
      the first processor is configured to start power supply to the second processor to activate the second processor;
      upon activation of the second processor, the second processor is configured to store the second data written to the common storage area of the storage to the first storage area of the storage; and
      upon completion of storing of the second data to the first storage area of the storage by the second processor, the first processor is configured to stop power supply to the second processor to deactivate the second processor.

2. The control device according to claim 1,
   wherein the first processor is configured to stop power supply to the second processor to deactivate the second processor during at least a part of a period between the reading operation and the writing operation.

3. The control device according to claim 1,
wherein the second processor is configured to perform operation management of the first storage area of the storage as a predetermined file system region.

4. The control device according to claim 1,
wherein a serial flash memory is used for the common storage area.

5. The control device according to claim 1,
wherein, in the reading operation, the first processor is configured to delete the first data from the common storage area of the storage after reading the first data from the common storage area of the storage, and
wherein, in the writing operation, the first processor is configured to delete the second data from the common storage area of the storage after the second processor stores the second data to the first storage area of the storage.

6. The control device according to claim 1, further comprising a communication circuit,
wherein the first processor is configured to control the communication circuit to communicate with an external device.

7. The control device according to claim 6,
wherein, in the reading operation, the first processor is configured to control the communication circuit to output the first data read from the common storage area of the storage to the external device, and
wherein, in the writing operation, the first processor is configured to control the communication circuit to acquire the second data to be written to the common storage area of the storage from the external device.

8. The control device according to claim 7,
wherein, in the reading operation, the first processor is configured to perform reading the first data from the common storage area of the storage and controlling the communication circuit to output the first data read from the common storage area of the storage to the external device in parallel, and
wherein, in the writing operation, the first processor is configured to perform controlling the communication circuit to acquire the second data and writing the second data acquired by the communication circuit to the common storage area of the storage in parallel.

9. An electronic timepiece comprising:
the control device according to claim 1;
a counter configured to count current date and time; and
a display configured to perform a display operation to display date and time based on the current date and time counted by the counter,
wherein the first processor is configured to control the display to perform the display operation by the display.

10. The electronic timepiece according to claim 9,
wherein the second processor which has the higher performance than the first processor is configured to perform reception processing of a satellite radio wave to acquire current date and time information.

11. The electronic timepiece according to claim 10,
wherein the satellite radio wave includes information regarding a position of a satellite which transmits the satellite radio wave, and
wherein the second processor which has the higher performance than the first processor is configured to:
perform reception processing of the satellite radio wave to acquire positioning information; and
generate the first data based on the positioning information; and
store the first data to be read during the reading operation in the first storage area.

12. The control device according to claim 1,
wherein in the reading operation:
the first processor is configured to start power supply to the common storage area of the storage to activate the common storage area of the storage;
upon activation of the common storage area of the storage and activation of the second processor, the second processor is configured to read the first data from the first storage area of the storage and write the first data to the common storage area of the storage;
upon completion of reading of the first data from the common storage area of the storage by the first processor, the first processor is configured to delete the first data from the common storage area of the storage and then stop power supply to the common storage area of the storage, and
wherein in the writing operation,
the first processor is configured to start power supply to the common storage area of the storage to activate the common storage area of the storage;
upon activation of the common storage area of the storage, the first processor is configured to write the second data to the common storage area of the storage; and
upon completion of storing of the second data to the first storage area of the storage by the second processor:
the first processor is configured to delete the second data from the common storage area of the storage and then stop power supply to the common storage area of the storage.

13. A method for controlling:
a first processor;
a second processor which has a higher performance than the first processor; and
a storage comprising:
a first storage area configured to be readable and writable by the second processor; and
a second storage area that is a common storage area configured to be readable and writable by the first processor and the second processor,
wherein the method comprises:
a reading operation comprising:
controlling the first processor to start power supply to the second processor to activate the second processor;
upon activation of the second processor, controlling the second processor to read first data from the first storage area of the storage and write the first data to the common storage area of the storage; and
upon completion of writing of the first data to the common storage area of the storage by the second processor, controlling the first processor to:
stop power supply to the second processor to deactivate the second processor; and
read the first data from the common storage area of the storage, and
a writing operation comprising:
controlling the first processor to write second data to the common storage area of the storage;
controlling the first processor to start power supply to the second processor to activate the second processor;
upon activation of the second processor, controlling the second processor to store the second data written to the common storage area of the storage to the first storage area of the storage; and upon completion of storing of the second data to the first storage area of the storage by the second processor, controlling the first processor to stop power supply to the second processor to deactivate the second processor.

14. A non-transitory computer readable storage medium which stores instructions to control:
a first processor;
a second processor which has a higher performance than the first processor; and
a storage comprising:
  a first storage area configured to be readable and writable by the second processor; and
  a second storage area that is a common storage area configured to be readable and writable by the first processor and the second processor,
wherein the instructions cause the first processor to at least:
in a reading operation:
  start power supply to the second processor to activate the second processor;
  upon activation of the second processor, control the second processor to read first data from the common storage area of the storage and write the first data to the common storage area of the storage; and
  upon completion of writing of the first data to the first storage area of the storage by the second processor:
    stop power supply to the second processor to deactivate the second processor; and
    read the first data from the common storage area of the storage; and
in a writing operation:
  write second data to the common storage area of the storage;
  start power supply to the second processor to activate the second processor;
  upon activation of the second processor, control the second processor to store the second data written to the common storage area of the storage to the first area of the storage; and
  upon completion of storing of the second data to the first area of the storage by the second processor, stop power supply to the second processor to deactivate the second processor.

* * * * *